United States Patent [19]
Hadeler et al.

[11] Patent Number: 5,455,770
[45] Date of Patent: Oct. 3, 1995

[54] VEHICLE MOVEMENT DYNAMICS CONTROL SYSTEM

[75] Inventors: Ralf Hadeler, Ludwigsburg; Rolf-Hermann Mergenthaler, Leonberg; Andreas Erban, Bietigheim-Bissingen; Gerhard Heess, Iffezheim, all of Germany

[73] Assignee: Robert Bosch GmbH, Stuttgart, Germany

[21] Appl. No.: 198,695

[22] Filed: Feb. 18, 1994

[30] Foreign Application Priority Data

Feb. 19, 1993 [DE] Germany .............. 43 05 155.3

[51] Int. Cl.⁶ .............................. B60T 8/32; B60T 8/64
[52] U.S. Cl. .............................. 364/426.01; 364/426.02; 364/424.05; 303/147; 180/197
[58] Field of Search .................. 364/426.01, 426.02, 364/426.04, 424.05, 431.12, 567; 303/93, 100, 102, 104, 113.02; 180/197, 170

[56] References Cited

U.S. PATENT DOCUMENTS

| | | | |
|---|---|---|---|
| 4,697,809 | 7/1987 | Ito et al. | 280/91 |
| 4,706,771 | 11/1987 | Kawabe et al. | 364/424.05 |
| 4,809,181 | 2/1989 | Ito et al. | 364/426.01 |
| 4,998,593 | 3/1991 | Kapnopp et al. | 364/426.02 |
| 5,207,483 | 5/1993 | Shimada et al. | 303/100 |
| 5,228,757 | 7/1993 | Ito et al. | 303/92 |
| 5,268,841 | 12/1993 | Mouri | 364/424.05 |

*Primary Examiner*—Kevin J. Teska
*Assistant Examiner*—Tan Nguyen
*Attorney, Agent, or Firm*—Felfe & Lynch

[57] ABSTRACT

A brake controller is connected downstream of a primary vehicle dynamics computer and has a channel for controlling the yaw velocity at a desired value, and a channel for limiting the sideslip angle. The computer prescribes the desired value and the limit value, and determines which channel is effective on the basis of the driving situation. The two channels generate a control signal which is routed via a control amplifier having a proportional component and a differential component. An actuating signal which is used to input braking pressure at the wheel brakes is formed from the resulting signal components, the instantaneous driving situation being assigned in both cases to one of a plurality of classes, and this assignment being co-used to determine the wheels at which braking pressure is input.

9 Claims, 2 Drawing Sheets

VEHICLE MOVEMENT DYNAMICS CONTROL SYSTEM

BACKGROUND OF THE INVENTION

The invention relates to a vehicle movement dynamics controller of the type having a primary vehicle movement dynamics computer and a secondary brake controller.

DE 40 30 724 discloses an ABS controller wherein the vehicle movement dynamics computer determines desired variables from measured and estimated variables, the desired variables being used to adjust braking pressures at the wheel brakes in order to effect stabilization of the vehicle. The measured variables used are wheel speeds $V_{Ri}$, yaw velocity ω, and the front axle steering angle $δ_v$. Estimated variables such as vehicle speed are generated from measured variables.

SUMMARY OF THE INVENTION

The modular vehicle movement dynamics controller according to the invention is hierarchically organized and divided into the vehicle movement dynamics computer (FDR) with the secondary modules of brake controller (BRG) and, in a further development, rear axle steering controller (HHL). The servo-systems of wheel controller and hydraulic rear axle steering are subordinated to these modules.

It is chiefly the untrained driver who is supported by the vehicle movement dynamics controller in critical driving situations. The vehicle is also stabilized in extreme situations. The deceleration is performed automatically in a critical situation if the vehicle is equipped with a device for braking independently of the driver. Track deviation and braking distance are reduced.

In addition to these FDR modules, which are described more precisely in the following description, and to the secondary BRG and EHL modules, it is possible if required to incorporate further modules such as a chassis and suspension controller, a correcting front axle steering controller and a drive torque distributor into the total system without having to change already existing secondary modules.

DETAILED DESCRIPTION OF THE PREFERRED EMBODIMENT

Figure 1:
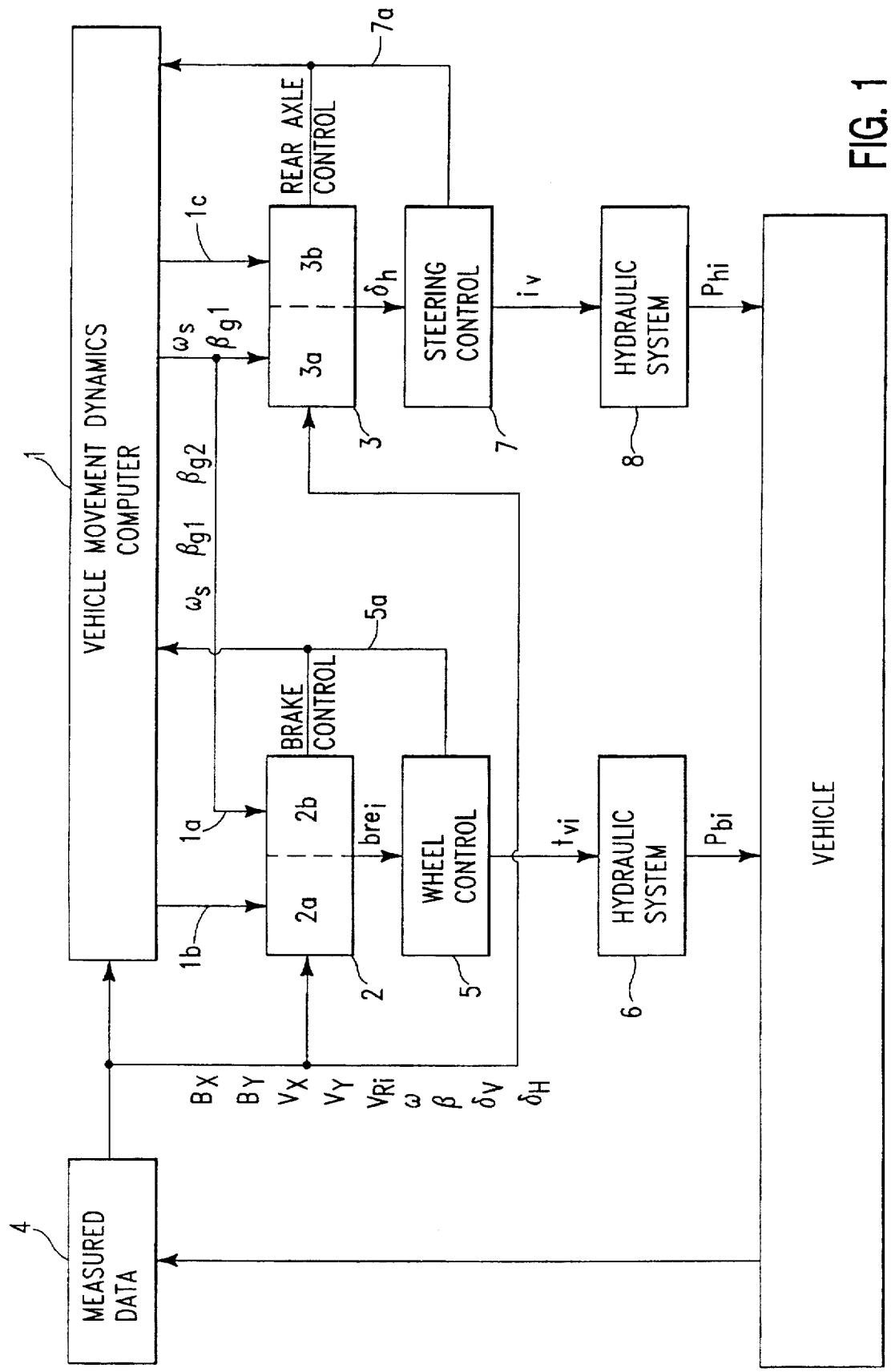
FIG. 1 is a block diagram showing an exemplary embodiment of the invention.

FIG. 1 shows a block diagram of a vehicle movement dynamics control system having a primary driving dynamics computer 1, a secondary brake controller 2 and a secondary rear axle steering controller 3. A block 4 represents the measurement data acquisition unit.

The measurement data acquisition unit 4 supplies a yaw velocity signal w, a sideslip angle signal β(β̇) estimated, for example, from the lateral velocity $V_y$, wheel speed signals $V_{Ri}$, steering angle signals $δ_v, δ_{fr}$, the vehicle speeds $V_x$ and $V_y$, and the accelerations $B_x$ and $B_y$.

The brake controller (BRG) is informed of the desired yaw velocity $W_s$ and limit values $B_{g1}$ and $B_{g2}$ of the sideslip angle and of the control mode by the vehicle movement dynamics computer (FDR) via the data interface line 1a. The measured variables are accessible to the FDR and the secondary modules.

The brake controller consists of a yaw velocity controller 2a and a sideslip angle controller 2b for limiting the sideslip angle. Depending on the driving situation, the instantaneous desired wheel slip is increased, or the desired wheel braking pressure is reduced by a secondary wheel controller 5 on the respective wheel, as a function of the brake controller action ($bre_i$). The valve opening times $T_{vi}$ output by the wheel controller 5 are converted by a 4-channel hydraulic system 6 into corresponding wheel braking pressure changes $P_{bi}$.

The rear axle controller 3 operates as a yaw velocity controller and can adjust the rear wheel steering angle $δ_h$ for the purpose of supporting the brake controller in the case of high sideslip angles. The rear wheel steering angle is set via a controller 7 which outputs signals $i_v$ to the HHL hydraulic system 8.

The vehicle movement dynamics computer 1 determines the desired value $w_s$ of the yaw velocity. In order to determine this desired value, the first step is to calculate the yaw amplification $gref_a$, which is independent of the coefficient of friction, from the vehicle longitudinal velocity $V_x$ and the parameter for the characteristic speed $V_{ch}$ of the vehicle. The parameter chosen for $V_{ch}$ will influence the oversteer or understeer.

$$gref_a = \frac{1}{1_{sp}} * \frac{V_x}{1 + \frac{V_x^2}{V_{ch}^2}}$$

where $1_{sp}$ is the wheelbase.

The maximum value for $gref_a$ is determined by the maximum drivable lateral acceleration $b_{ymax}$. The following condition must therefore be fulfilled:

$$gref_a \leq \frac{b_{ymax}}{V_x * δ_V} \quad b_{ymax} = 9 \text{ m/s}^2$$

In addition to the yaw amplification $gref_a$, which is independent of the coefficient of friction, a yaw amplification $gref_b$ which is a function of the utilized coefficient of friction $μ_A$ is introduced. The utilized coefficient of friction $μ_A$ is required in order to determine $gref_b$. The former can be determined as follows, for example:

$$μ_A \equiv \frac{1}{g} * \sqrt{B_x^2 + B_y^2}$$

If we limit ourselves to braked manoeuvres, it is possible to dispense with the lateral acceleration $B_y$; the acceleration is then sufficient and can be determined from the gradient of the reference velocity, i.e. reference acceleration, which may be determined by differentiating $v_x$.

$$μ_A \equiv \frac{1}{g} * |V_{refp}|,$$

where $V_{refp}$ is the reference acceleration.

It holds that:

$$g_{refb} = \left| \frac{P_{bv} * \mu_A * g}{V_x * \sigma_V} \right|$$

In addition, the following condition must be fulfilled:

$$g_{refb} \leq g_{refa}$$

Multiplying the two yaw amplifications by the front steering angle yields the yaw velocities corresponding thereto.

$$w_a = gref_a * \delta_v$$

$$w_b = gref_b * \delta_v$$

In order to increase the steerability of the vehicle, particularly on low coefficients of friction, the desired value for the yaw velocity is briefly overshot as a function of the front axle steering angle gradient $\delta_{VP}$ prescribed by the driver. For this purpose, the desired value $W_s$ of the yaw velocity is increased for a short time to a value which is greater than the yaw velocity $w_b$ which is a function of the coefficient of friction. After the rapid steering movement is concluded (small steering angle gradient), this overshoot again decays in accordance with a transfer function to its value $w_b$ of the yaw velocity, which is a function of the coefficient of friction. It is possible in this way substantially to improve the response of the vehicle to rapid steering wheel movements.

The first step is to form the absolute value of the filtered gradient of the steering angle:

$$\sigma_{vp}(k+1) = \sigma_{vp}(k) + \frac{\tau}{tp\_\sigma_{vp}} *$$

$$\left\{ \left| \frac{\lambda}{\tau} * |\sigma_v(k) - \sigma_v(k-1)| \right| - \sigma_{vp}(k) \right\}$$

using the steering angle gradient $\delta_{vp}$, the computer sampling rate interval $\tau$, the filter parameter for the steering angle gradient $tp\_\delta_{vp}$ and the condition: set $\delta_{vp}=0$ if $\delta_{vp}<\delta vpmin$.

The transfer function $dtl\_\delta_{vp}$ for $\delta_{vp}$ is formed with the aid of $\delta_{vp}$:

$$dtl\_\sigma_{vp}(k+1) = kvd * \sigma_{vp}(k) +$$

$$\left\{ 1 - \frac{\tau}{tp\_dtl\_\sigma_{vp}} \right\} * dtl\_\sigma_{vp}(k) \leq 1.0,$$

using the gain kvd for $\delta_{vp}$ and the filter parameter $tp\_dtl\_\delta_{vp}$ for the transfer function $dtl\_\delta_{vp}$.

The weighting factor $dtl\_lenk$ is generated from the transfer function. The factor p-lenk is used for the application of the vehicle response:

$$dtl\_lenk = dtl\_\delta_{vp} * p\_lenk$$

The desired value for the yaw velocity is obtained from the components $w_a$ and $w_b$ weighed with $dtl\_lenk$. The maximum overshoot is determined using $p\_max_{wa}$ ($p\_max_{wa}<1$). The desired yaw behaviour of the vehicle is determined by a model in the form of a delay term having a parameter which is a function of velocity.

The result is the desired value of the yaw velocity $w_s$.

$$w_s(k+1) = w_s(k) + \frac{\tau}{t_{ref}} * [dtl\_lenk * p\_max_{wa} * w_a +$$

$$(1 - dtl\_lenk) * w_b - w_s(k)].$$

The parameter $t_{ref}$ (time constant of the reference model) is obtained from the following relationship:

$$t_{ref} = t_{ref0} + P_{tref} * (V_x - V_{ch}).$$

Here, $t_{ref0}$ is the basic time constant of the model and $P_{tref}$ is a parameter for adapting $t_{ref}$ as a function of $v_x$ and $v_{ch}$. The vehicle movement dynamics computer 1 also determines the limit value for the sideslip angle $\beta_g$. The filtered actual sideslip angle itself is obtained either from the measured or from the estimated lateral velocity $v_y$.

$$\beta(k+1) = \beta(k) + \frac{\tau}{tp\_\beta} * \left\{ \frac{-V_y}{V_x} - \beta(k), \right\}$$

using the filter parameter $tp\_\beta$ of the $\beta$ calculation.

The limit value for the sideslip angle of the vehicle is determined from a characteristic map whose arguments are the driving speed and the utilized coefficient of friction $\mu_A$. The sign is yielded by the actual sideslip angle $\beta$. The limit value for the sideslip angle $\beta_{g1}$ is then obtained by filtering the raw value $\beta_{rg}$.

$$\beta_{rg} = sign(\beta) * \beta_g(\mu_A, V_x)$$

$$\beta_{g1}(k+1) = \beta_{g1}(k) + \frac{\tau}{tp\_\beta_g} * (\beta_{rg}(k) - \beta_{g1}(k))$$

using $tp\_\beta_g$, the filter parameter of the $\beta g$ calculation.

A second limit value $\beta_{g2}$ which is substantially higher than the limit value $\beta_{g1}$ is formed from this limit value. It is used to detect a particularly critical situation.

$$\beta_{g2} = P_{krit} * \beta_{g1}$$

where $P_{krit}=2.0$ (for example).

By comparing the actual values with the desired value for the yaw velocity and limit value of the sideslip angle, the driving condition is also determined in the vehicle movement dynamics computer 1, and the control mode is derived therefrom. A distinction is made between the two control modes of "w control" and "$\beta$limitation", only one of which is active at a time. In the case of a stable driving condition, the yaw velocity is controlled, and upon reaching $\beta_{g1}$ with a further rising tendency the sideslip angle is limited to the limit value $\beta_{g1}$. Upon overshooting the limit value $\beta_{g2}$ and given a corresponding vehicle speed, the control mode "$\beta$ limitation" is present whether or not a rising tendency is present.

In order to detect a further increase or decrease in the sideslip angle, it is necessary to determine the gradient thereof. This is performed by differentiation and subsequent filtering of $\beta$.

$$\beta_{pfil}(k+1) = \beta_{pfil}(k) + \frac{\tau}{tp\_\beta_p} *$$

-continued $$\left\{ \frac{\beta(k)-\beta(k-1)}{\tau} \quad \frac{\beta(k)}{-\beta_{pfil}(k)} \right\}$$

using, the filter parameter tp_βp of the $\beta_{pfil}$ calculation.

The special control mode "β limitation" is present when it holds that: when driving in a left-hand bend $$\beta>0\cdot|(\beta>\beta_{g1}\cdot\beta_{pfil}>0)+\beta>\beta_{g2}|$$

when driving in a right-hand bend:

$$\beta<0\cdot|(\beta<\beta_{g1}\cdot\beta_{pfil}<0)+\beta<\beta_{g2}|$$

in this case, the symbol "·" stands for logic AND operation. The symbol "+" stands for logic OR operation.

In all other cases, the normal mode "w control" is present. However, there are generally effective conditions for terminating the control mode "β limitation" and again selecting the mode "w control". These conditions are:

Upon undershooting of a specific velocity threshold $v_{xbs}$ the mode "w control" becomes effective in each case, that is to say:

"w control"
if $V_x<V_{xbs}$.

It is expedient in specific situations to employ the desired and actual values of the yaw velocity in the existing mode of "β limitation" as a criterion for changing the mode to "w control".

"w control"
if $$|\beta|<|\beta_{g2}|,\ |(|w|<p\_\beta w^*\ |w_{soll}|)+(w^*w_{soll}<0)|$$

The vehicle can be stabilized by the modular vehicle movement dynamics controller only if an adequate inlet pressure is present for controlling the wheels by the brake controller. If the driver makes too little inlet pressure available, or does not brake at all, stabilization of the vehicle is possibly no longer guaranteed. It is therefore sensible to trigger automatic deceleration of the vehicle in critical situations or to make an adequate inlet pressure available.

Triggering the active brake is performed on the basis of a high system deviation with respect to the yaw velocity and/or because of an excessively high attitude angle. The two conditions cannot be mutually exclusive.

The vehicle movement dynamics computer 1 firstly evaluates the system deviation of the yaw velocity. If over a certain time there is a clear system deviation in the yaw velocity from its desired value, and if this system deviation has a further rising tendency, the FDR signals by generating a signal "AKTIVE BREMSE" ("Active Brake") to the secondary brake controller 2 that an active inlet pressure build-up is to be performed.

For this purpose, the first step is to form the system deviation of the yaw velocity and filter it strongly (filter as averaging element), so that not every unimportant deviation leads to triggering the active brake.

$$err\_w_{fil}(k+1) = err\_w_{fil}(k) + \frac{\tau}{tp\_err\_w_{fil}} *$$

$$w_s(k) = w(k) - err\_w_{fil}(k)].$$

Formation of the gradient of the filtered system deviation:

$$err\_w_{pfil}(k+1) = \frac{1}{\tau} * [|err\_w_{fil}(k)| - |err\_w_{fil}(k-1)|].$$

If the system deviation overshoots a threshold with a further rising tendency, the inlet pressure is made available.
The AKTIVE_BREMSE is provided if $$[|err\_w_{fil}|>err\_w\_aktiv\_ein]\cdot[err\_w_{pfil}>0].$$

Here, err_w_aktiv_ein is a prescribed constant.

In addition to the yaw velocity, the sideslip angle of the vehicle is also incorporated into the situation detection for triggering an active inlet pressure build-up. If the sideslip angle overshoots a specific threshold (depending on the utilized coefficient of friction) with a further rising tendency, the brake controller is likewise prompted to active inlet pressure build-up. If the sideslip angle undershoots a specific threshold with a falling tendency, the "AKTIVE_BREMSE" is reset. A hysteresis function is involved here.

The AKTIVE_BREMSE is rendered active if $$[(|\beta|\beta_{g1}|*p\beta\_ein\leq\cdot[\beta*\beta_{pfil}>0]] + [|\beta|>|\beta_{g2}|]$$

pβ_ein is a constant here.
The symbol "·" stands for logic AND operation.
The symbol "+" stands for logic OR operation.
The parameter pβ_ein is used for the application of the sideslip angle limits at the overshooting of which active braking is to be performed.

In addition, the following resetting conditions hold:
the AKTIVE_BREMSE is switched off if $$||\beta|<|\beta_{g1}|*p\ \beta\_aud]\cdot[\beta*\beta_{pfil}<0|$$

Upon undershooting of a specific velocity threshold vx. aktiv_off, no further active braking is permitted.
AKTIVE_BREMSE is switched off if $$VX<vx\_aktiv\_off.$$

The "active braking" mode exists in parallel with the modes of "w control" and "β limitation", and can be performed only by vehicles appropriately equipped therefor (possibility of providing an inlet pressure independent of the driver must be present). In FIG. 1 the hydraulic system 6 must include a pressure source such as a pump and accumulator, and appropriate valving responsive to signals $t_{vi}$.

As already mentioned, the brake controller 2 contains two separate controllers for controlling the yaw velocity w and for limiting the sideslip angle β. The control mode prescribed by the vehicle movement dynamics computer 1 determines which controller generates the manipulated variables. The manipulated variable is split differently between the individual wheels depending on the driving condition. The actuating signals of the brake controller 2 are interpreted by the secondary wheel controller 5. If the system deviations undershoot a specific measure, the secondary wheel controller 5 is not influenced by the brake controller. The task of the wheel controller 5 is to stabilize the wheels and to optimize the braking forces on the respective wheel.

The yaw velocity controller 2a is activated when the vehicle movement dynamics computer 1 prescribes the mode of "w control" by mode control interface line 16. The yaw velocity controller 2a operates as a nonlinear PDT$_1$ controller and forms from the system deviation $\epsilon_w$ the two controller output variables $p_w$ and $dtl_w$. We obtain for the system deviation:

$$\epsilon_w(k)=w_s(k)-w(k).$$

The result for the proportional component $p_w$ is:

$$p_w\epsilon_w(k)*Kp_w,$$

$Kp_w$ being a gain.

We obtain for the differential component, $vdtl_w$ being used as a factor to increase the $dtl_w$ component, that:

$$dtl_w(k+1) = vdtl_w * \frac{\epsilon_w(k) - \epsilon_w(k-1)}{\tau} +$$

$$dtl_w(K) * \left\{ 1 - \frac{\tau}{tdtl\_w} \right\}$$

where td+1_w is a decay time constant.

Of the subsequent manipulated variable distribution, only absolute values of the controller components or the aggregate signal from the proportional and differential components are further processed. A cut-off factor linearly reduces the manipulated variables as a function of the vehicle speed as soon as the vehicle speed has undershot a certain threshold $v_{ab}$.

$$pabs_w=|p_w|*abr_{13}faktor.$$

$$pdtlabs_2=|p_w+dtl_w|*abr_{13}faktor.$$

It holds for the cut-off factor that:

abr faktor = 1 if $V_x > V_{ab}$, otherwise $abr.faktor = \frac{V_x - v_{min}}{v_{ab} - v_{min}}$ $V_{min}$ is the termination velocity and $v_{ab}$ a prescribed threshold.

An insensitivity zone $w_{tot}$ is determined as a function of $w_a$ in the following way:

$$w_{tot}(k+1) = w_{tot}(k) + \frac{\tau}{t_{ref}} *$$

$$|(w_{tot\_par}*|w_a(k)| + w_{tot\_0}) - w_{tot}(k)|,$$

using the time constant $t_{ref}$ and the parameter $w_{tot}$ for the insensitivity range.

In this case, $W_{tot}$ must lie within a specific range:

$$w_{tot\ min}<w_{tot}<w_{tot\ max}.$$

The driving condition of the vehicle must be determined in relation to the driver's wishes before the two controller output variables are further processed. Depending on the system deviation $\epsilon_w$ and steering angle $\delta_v$, five driving conditions are distinguished in the control mode of "w control" which are classified as follows:

Left-hand bend, oversteering:

$$\delta_v \geq 0 \cdot \epsilon_w<0 \cdot |\epsilon_w|>w_{tot}.$$

Left-hand curve, understeering:

$$\delta_v \geq 0 \cdot \epsilon_w>0 \cdot |\epsilon_w|>w_{tot}.$$

Neutral:

$$|\epsilon_w|>w_{tot}.$$

Right-hand curve, oversteering:

$$\delta_w<0 \cdot \epsilon_w>0 \cdot |\epsilon_w|>w_{tot}.$$

Right-hand curve, understeering:

Note: the symbol "·" stands for logic AND operation.

The neutral driving condition is present if the system deviation lies within the insensitivity zone $[-w_{tot}; w_{tot}]$.

The brake controller signals $bre_i$ for the secondary wheel controller 5 are formed from the driving condition determined in the controller 2 and the two controller output variables. Depending on the sign of the brake controller signals $bre_i$, this leads to an increase in the wheel slip ($bre_i>0$) or a pressure decrease ($bre_i<0$) at the corresponding wheel. Increase in the wheel slip beyond the value already set by the wheel controller causes a decrease in the lateral force in conjunction with a slight change in the longitudinal force. A braking pressure decrease reduces the longitudinal force in conjunction with an increase in the available lateral force potential at the respective wheel. As a result, yawing moments are produced about the vehicle vertical axis which have a stabilizing effect on the vehicle.

The actuating signals for the secondary wheel controller are formed as a function of the driving condition. The reactions are listed in Table I for the five cases described above.

The parameter $gse_w$ employed there is used to restandardize the controller output variables into corresponding slip increases at the respective wheel. The parameter $gpa_w$ is used to adapt the controller output variables in order to achieve a corresponding pressure reduction at the relevant wheel. If the actuating signal $bre_i>0$, and consequently a slip increase is to be performed at the wheel i, the control action is limited to $s_{max}$ in order to avoid excessively high slip values.

$$bre_i<S_{max}.$$

The controller 2b for limiting the sideslip angle likewise operates as a nonlinear $PDT_1$ controller, and comes into action when the vehicle movement dynamics computer 1 prescribes the mode of "β limitation" via the line 1b. The two controller output variables pβ and $dtl_β$ are formed from the system deviation $\epsilon_β$. We obtain for the system deviation:

$$\epsilon_β(k=β_{g1}(k)-β(k).$$

It follows for the proportional component $p_β$ that:

$$P_β=E_β(k)*Kp_β,$$

$Kp_β$ again being a gain.

When forming the differential component $dtl_β$, it is determined with which gradient $\Delta\epsilon_β$ the system deviation $\epsilon_β$ increases. The $dtl_β$ component is updated only if the gradient of the system deviation exceeds a specific measure $K\Delta\epsilon_β$. For this purpose, the gradient of the system deviation is firstly formed and filtered:

$$\Delta\epsilon_β\ fil(k+1) = \Delta\epsilon_β\ fil(k) + \frac{\tau}{t_p - \Delta\epsilon_β} *$$

$$\left\{ \frac{\epsilon_β(k) - \epsilon_β(k-1)}{\tau} - \Delta\epsilon_β\ fil(k) \right\}$$

Here, $tp\_\Delta\epsilon_β$ is a filter parameter.

The $dtl_β$ component is updated when the following condition is fulfilled:

$$|\Delta\epsilon_{\beta\text{fil}}(k+1)>K\Delta\epsilon_\beta\cdot\beta<0| + |\Delta\epsilon_{\beta\text{fil}}(k+1)<-K\Delta\epsilon_\beta\cdot\beta>0|$$

It then follows for the $dtl_\beta$ component that:

$$dtl_\beta(k+1) = \Delta\epsilon_\beta\,\text{fil}(k+1) + dtl_\beta(k) * \left\{ 1 - \frac{\tau}{tdtl\_\beta} \right\}$$

is the decay time constant. If this condition is not fulfilled, the $dtl_\beta$ component decays:

$$dtl_\beta(k+1) = dtl_\beta(k) * \left\{ 1 - \frac{\tau}{tdtl\_\beta} \right\}.$$

Of the $p_\beta$ component and $dtl_\beta$ component, only absolute values are further processed in the case of the subsequent manipulated variable distribution. The gain $vdtl_\beta$ is used to increase the $dtl_\beta$ component.

$$pabs_\beta = |P_\beta|, \quad dtlabs_\beta = vdtl_\beta * |dtl_\beta|.$$

Before further processing, the driving condition of the vehicle must be determined as a function of the sideslip angle $\beta$. There are four driving conditions:

Left-hand bend, high sideslip angle: $\beta \geq \beta_{g1} > 0$

Left-hand bend, critical situation: $\beta \geq \beta_{g2} > \beta_{g1} > 0$

Right-hand bend, high sideslip angle: $\beta \leq \beta_{g1} < 0$

Right-hand bend, critical situation: $\beta \leq \beta_{g2} < \beta_{g1} < 0$

The actuating signals for the secondary wheel controller are formed as a function of the driving condition. Table II indicates the measures which are undertaken in the individual driving conditions.

A critical situation arises when the vehicle encounters a very high sideslip angle, caused by a steering error of the driver for example. In this situation, an increased control action $s_{not}$ is permitted so that the vehicle can be restabilized.

If active braking is triggered by the vehicle movement dynamics computer 1, the brake controller 2 acts via the secondary wheel controller 5 on the hydraulic valves 6 and initiates a controlled inlet pressure buildup. For this purpose, the control valves are set briefly to pressure hold until, after the changeover of a changeover valve, a pressure accumulator provides the required inlet pressure at the control valves. The wheel braking pressure is now increased with the aid of the control valves in accordance with a transfer function (for example, a log base exponential function ex) in the individual wheel brake cylinders, and an excessively high pressure build-up gradient is thereby avoided. The pressure build-up can be performed in a controlled fashion, or can be input in accordance with a pulse sequence depending on whether the inlet pressure is measurable or not. As soon as the mode "active braking" is terminated, the changeover valves are set such that the driver can generate the inlet pressure again.

The rear axle steering algorithm of the rear axle steering controller 3, which can operate in parallel with the brake controller 2, contains two alternative function units (3a and 3b):

Control of the vehicle yaw velocity (3a)

Limitation of the vehicle sideslip angle (3b).

By means of the variable of "control mode" (line 1c), the primary vehicle movement dynamics computer 1 determines which of the two function units is executed. The two function units generate a value which is to be set for the rear wheel steering angle $\delta_h$.

Figure 2:
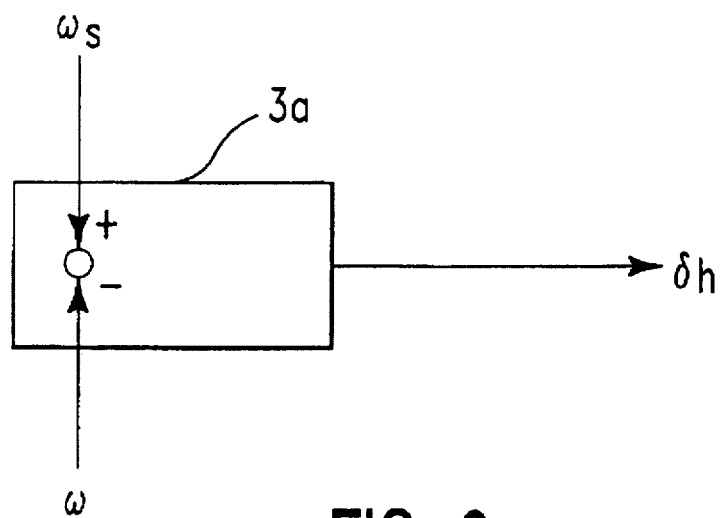
FIG. 2 is a block diagram of the rear steering angle control based on yaw velocity.

By steering the rear wheels, the slip angles, and thus the lateral forces occurring at the rear wheels are varied. Stabilizing yawing moments are thus exerted on the vehicle. The yaw velocity controller 3a accomplishes this through setting the desired value $w_s$ prescribed by the vehicle movement dynamics computer 1 by steering the rear wheels. An arbitrary control algorithm, for example a PID controller or a controller described in DE 4,030,846-A1, can be used for this purpose. The result is the block diagram shown in FIG. 2.

Stabilization of the vehicle in the event of excessively high sideslip angles can be achieved by the rear axle steering angle controller when an increase in the lateral forces at the rear wheels is achieved by means of steering. In this case, the maximum achievable lateral force is to be set at the rear wheels. The lateral force is directly dependent on the slip angle, and thus on the steering angle of a wheel.

If the optimum slip angle value $\alpha_{opt}$ at which the maximum lateral force occurs is known (for example, as the measured characteristic stored in the vehicle movement dynamics computer as a function of the coefficient of friction $\alpha_{opt}=f(\mu_A)$), it is possible to set this slip angle at the rear wheels directly by means of a controller. It holds to a good approximation for the rear wheels that $$\alpha_h = \delta_h + \beta + (l_h \times w)/v_x$$

where $\alpha_h$ is the slip angle, rear wheels $\delta_h$ is the steering angle, rear wheels $\beta$ is the sideslip angle, vehicle $l_h$ is the distance between the vehicle centre of gravity and the rear axle w is the yaw velocity, vehicle $v_x$ is the longitudinal velocity, vehicle.

The control rule for the rear wheel steering angle for setting the optimum slip angle at the rear wheels is therefore as follows:

$$\delta_h = \alpha_{opt} - \beta - (l_h \times w)/v_x.$$

Figure 3:
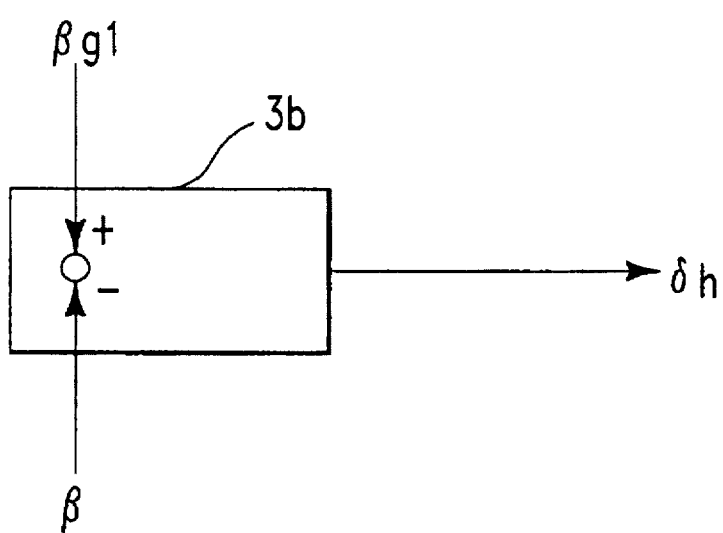
FIG. 3 is a block diagram of the rear steering angle control based on the sideslip angle.

When the value $\alpha_{opt}$ is unknown, a value for the rear wheel steering angle $\delta_h$ can be generated by means of an sideslip angle controller, so that stabilization of the vehicle is performed. (The controller is analogous to the yaw velocity controller described above.) The attitude angle limit value $\beta_{g1}$ prescribed by the vehicle movement dynamics computer 1 is used as desired value. Here, as well, an arbitrary control algorithm, e.g. a PID controller, can be used. The block diagram of FIG. 3 then results.

The angular value $\delta_h$ determined in the block 3a or 3b is converted into a signal $i_v$ by the position controller 7 which controls the hydraulic unit 8. The hydraulic unit 8 produces pressures $p_{hi}$ by which the rear steering angle $\delta_h$ is effected.

If one of the subsystems 2, 5 fails, block 1 is informed by line 5a so that the subsystems 3, 7 influence the system independently. Likewise if one of the subsystems 3, 7 fails, block 1 is informed by line 7a so that subsystems 2, 5 influence the system independently.

Summary of the Variables Used in the FDR and BRG
With Exemplary Magnitudes abr_faktor : Velocity-dependent cut-off factor. (0 . . . 1)

$\beta$: Sideslip angle of the vehicle ($\tan\beta = -v_y/v_x$)

$\beta_g$: Raw value of the limit value for $\beta$ from the characteristic map.

$\beta_{g1}$ Limit value for the sideslip angle. (0.06 ... 0.18 rad)

$\beta_{g2}$ Limit value for $\beta$ for detecting a critical situation. (0.13 ... 0.25 rad)

$p_{fil}$: Gradient of the sideslip angle.

$\beta_{rg}$ Raw value of $\beta_g$ with sign.

$bre_i$: Control action of the brake controller at the wheel i.

$b_{ymax}$: Maximum value of the permissible lateral acceleration. (10 ... 12 m/s$^2$)

$b_{ytol}$: Insensitivity range for the limitation of $g_{ref}$.

$B_x$: Longitudinal acceleration of the vehicle $B_y$: Lateral acceleration of the vehicle.

$\delta_v$: Front axle steering angle.

$\delta_{vp}$: Gradient of the front axle steering angle.

$\delta_{vpmin}$: Threshold for the gradient of the front axle steering angle. (0.1 rad/s)

dtlabs$_\beta$: Absolute value of the weighted differential component from the $\beta$ controller.

dtlabs$_w$: Absolute value of the weighted differential component from the w controller.

dtl_$\delta_{vp}$: Transfer function for $\delta_{vp}$.

dtl_lenk: Weighting factor for the formation of $w_{soll}$ [$w_{das}$]·(0 ... 1)

dtl$_\beta$: differential component from the $\beta$ controller (rad/sec$^2$).

dtl$_w$: differential component from the w controller (rad/sec$^2$).

$\Delta E_{\beta fil}$: Gradient of the system deviation for the sideslip angle.

err_$w_{fil}$: Filtered system deviation of the yaw velocity.

err_$w_{pfil}$: Filtered gradient of the yaw system deviation.

err_w_aktiv_ein: Threshold for triggering active braking. (0.1 rad/s)

$\epsilon_\beta$: System deviation of the sideslip angle.

$\epsilon_w$: System deviation of the yaw velocity.

g : Acceleration due to gravity (9.81 m/s$^2$)

gpa$_\beta$: Parameter for adapting the pressure build-up in the mode of "$\beta$ limitation". (−0.1 ... −0.2)

gpa$_w$: Parameter for adapting the pressure build-up in the mode of "w control" (−0.1 ... −0.2)

$g_{refa}$: Yaw amplification independent of the coefficient of friction.

$g_{refb}$: Yaw amplification as a function of the coefficient of friction.

$g_{refmax}$: Maximum permissible yaw amplification. (30 1/s)

gse$_\beta$: Parameter for adapting the increase in slip in the mode of "$\beta$ limitation". (0.1 ... 0.2)

gse$_w$: Parameter for adapting the increase in slip in the mode of "w control". (0.1 ... 0.4)

$K\Delta\epsilon_\beta$: Threshold for updating the dtl component. (0.03 rad/s$^2$)

$Kp_\beta$: Amplification for the proportional component in the $\beta$ controller. (0.1 ... 0.3)

$Kp_w$: Amplification for the proportional component in the w controller. (4 ... 8)

kvd: Gain for $\delta_{vp}$. (0.2 ... 0.4)

$l_{sp}$: Wheelbase of the vehicle.

$\mu_A$: Utilized coefficient of friction.

w: Yaw velocity $w_a$: Desired value, independent of the coefficient of friction, for the yaw velocity.

$w_b$: Desired value, dependent on the coefficient of friction, for the yaw velocity.

$w_s$: Desired value for the yaw velocity.

$w_{tol}$: Insensitivity range for w control.

$w_{tol-o}$: Minimum value for insensitivity in the case of w control. (0.06)

$w_{tol}$-par: Parameter for the insensitivity range for w control (−0.2)

$w_{tol-min}$: Minimum insensitivity for w control. (0.02 ... 0.03)

$W_{tol-max}$: Maximum insensitivity for w control. (0.04 ... 0.1)

pabs: Absolute value of the P component in the controller.

pabs$_w$: Absolute value of the P component in the w controller.

pdtlabs$_w$: Absolute value of the manipulated variable of the w controller.

$p_\beta$: P component from the $\beta$ controller.

$p_\beta$_ein: Parameter for determining the sideslip angle limits for triggering active braking. (0.8 ... 1.2)

$p_\beta$-aud: Parameter for determining the attitude angle limits for shutting off active braking (0.6 ... 1.0).

p_$\beta$w: Parameter for change of mode. (0.9)

$P_{by}$: Parameter for the determination of $g_{refb}$. (0.7)

$p_w$: P component from the w controller.

$p_{krit}$: Parameter for the limit value $\beta_{g2}$. (2.0)

p_lenk : Parameter for the dtl_lenk. (0.8)

p_max$_{wa}$: Parameter for the maximum overshoot of $w_s$. (0.5 ... 1)

$P_{tref}$: Parameter for adapting $t_{ref}$ as a function of $V_x$ or $V_{ch}$. (0.003)

$s_{max}$: Maximum permissible slip increase in an uncritical situation. (0.40)

$s_{not}$: Maximum permissible slip increase in a critical situation. (0.70)

$\tau$: Sampling interval of the computer (sec).

tdtl_$\beta$: Decay time constant in the $\beta$ controller. (0.1 s)

tdtl_w: Decay time constant in the w controller. (0.012s)

tp_$\beta$: Filter parameter, $\beta$ calculation. (0.2 s)

tp_$\beta_g$: Filter parameter, $\beta_g$ calculation. (0.25 s)

tp_$\beta_p$: Filter parameter $\beta_{pfil}$ calculation (0.2 s)

tp_$\delta_{vp}$: Filter parameter for steering angle gradient. (0.4 s).

tp_dtl_$\delta_{vp}$: Filter parameter for the transfer function dtl_$\delta_{vp}$. (0.3 s)

tp_$\Delta\epsilon_\beta$: Filter parameter for $\Delta\epsilon_{\beta fil}$ calculation. (0.1 s)

tp_err_$w_{fil}$: Filter parameter for yaw system deviation. (0.5 s)

$t_{ref}$: Time constant of the w reference model.

$t_{ref0}$: Basic time constant of the w reference model. (0.04 s)

$V_{ch}$: Parameter for the characteristic velocity. (17 ... 25)

vdtl$_\beta$: Parameter for increasing the differential component in the $\beta$ controller. (0.25)

vdtl$_w$: Parameter for increasing the differential component in the w controller. (0.4)

$V_{refp}$: Reference acceleration of the vehicle.

$V_{ab}$: Threshold for cut off (6 m/s)

$V_{min}$: Termination velocity. (2 m/s)

$V_x$: Vehicle longitudinal speed.

vx aktiv_off : Termination threshold for active braking. (5 m/s)

$V_{xbs}$: Termination threshold for the mode of "β limitation". (3 m/s)

$V_y$: Vehicle lateral speed.

TABLE I

| Actuating signals for ω control. | |
|---|---|
| Driving condition | Type of action |
| Neutral | No action |
| $\|\epsilon_\omega\| < \omega_{tot}$ | $brev_{v1} = 0$ |
| | $brev_{vr} = 0$ |
| | $bre_{h1} = 0$ |
| | $bre_{hr} = 0$ |
| Left-hand bend, oversteering | Slip increase VA. |
| | $brev_{v1} = gse_\omega * pabs_\omega < s_{max}$ |
| $\|\epsilon_\omega\| > \omega_{tot}$ | $brev_{vr} = gse_\omega * pabs_\omega < s_{max}$ |
| $\delta_v > 0$ | $bre_{h1} = 0$ |
| $\epsilon_\omega < 0$ | $bre_{hr} = 0$ |
| Left-hand bend, understeering | Pressure decrease VA on the outside of the bend, and slip increase HA on the outside of |
| $\|\epsilon_\omega\| > \omega_{tot}$ | the bend |
| $\delta_v > 0$ | $brev_{v1} = 0$ |
| $\epsilon_\omega > 0$ | $brev_{vr} = gpa_\omega * pdtlabs_\omega$ |
| | if $(p_\omega + dtl_\omega > 0)$, |
| | otherwise $brev_{vr} = 0$ |
| | $bre_{h1} = 0$ |
| | $bre_{hr} = gse_\omega * pabs_\omega < s_{max}$ |
| Right-hand bend, oversteering | Slip increase VA. |
| | $brev_{v1} = gse_\omega * pabs_\omega < s_{max}$ |
| $\|\epsilon_\omega\| > \omega_{tot}$ | $brev_{vr} = gse_\omega * pabs_\omega < s_{max}$ |
| $\delta_v < 0$ | $bre_{h1} = 0$ |
| $\epsilon_\omega > 0$ | $bre_{hr} = 0$ |
| Right-hand curve, understeering | Pressure decrease VA on the outside of the bend, and slip increase HA on the outside of |
| $\|\epsilon_\omega\| > \omega_{tot}$ | the bend |
| $\delta_v < 0$ | $brev_{v1} = gpa_\omega * pdtlabs_\omega$ |
| $\epsilon_\omega < 0$ | if $(p_\omega + dtl_\omega < 0)$, |
| | otherwise $brev_{v1} = 0$ |
| | $brev_{vr} = 0$ |
| | $bre_{h1} = gse_\omega * pabs_\omega < s_{max}$ |
| | $bre_{hr} = 0$ |

TABLE II

| Actuating signals for β control. | |
|---|---|
| Driving condition | Type of action |
| Left-hand bend, high sideslip angle | Slip increase VA. |
| $\beta \geq \beta_{g1} > 0$ | Pressure decrease HA, on the inside of the bend. |
| | $brev_{v1} = gse_\beta * (pabs_\beta + dtlabs_\beta) < s_{max}$ |
| | $brev_{vr} = gse_\beta * (pabs_\beta + dtlabs_\beta) < s_{max}$ |
| | $bre_{h1} = gpa_s * dtlabs_\beta$ |
| | $bre_{hr} = 0$ |
| Left-hand bend, critical situation | Slip increase VA. |
| $\beta \geq \beta_{g2} > \beta_{g1} > 0$ | Pressure decrease HA, on the inside of the bend. |
| | $brev_{v1} = gse_\beta * (pabs_\beta + dtlabs_\beta) < s_{not}$ |
| | $brev_{vr} = gse_\beta * (pabs_\beta + dtlabs_\beta) < s_{not}$ |
| | $bre_{h1} = gpa_s * dtlabs_\beta$ |
| | $bre_{hr} = 0$ |
| Right-hand curve, high sideslip angle | Slip increase VA. |
| $\beta \leq \beta_{g1} < 0$ | Pressure decrease HA, on the inside of the bend. |
| | $brev_{v1} = gse_\beta * (pabs_\beta + dtlabs_\beta) < s_{max}$ |
| | $brev_{vr} = gse_\beta * (pabs_\beta + dtlabs_\beta) < s_{max}$ |
| | $bre_{h1} = 0$ |
| | $bre_{hr} = gpa_\beta * dtlabs_\beta$ |
| Right-hand bend, critical situation | Slip increase VA. |
| $\beta \leq \beta_{g2} < \beta_{g1} < 0$ | Pressure decrease HA, on the inside of the bend. |

TABLE II-continued

| Actuating signals for β control. | |
|---|---|
| Driving condition | Type of action |
| | $brev_{v1} = gse_\beta * (pabs_\beta + dtlabs_\beta) < s_{not}$ |
| | $brev_{vr} = gse_\beta * (pabs_\beta + dtlabs_\beta) < s_{not}$ |
| | $bre_{h1} = 0$ |
| | $bre_{hr} = gpa_\beta * dtlabs_\beta$ |

We claim:

1. Method for stabilizing movement of a vehicle, said method comprising the following steps:

measuring wheel speeds $v_{Ri}$, yaw velocity w, front axle steering angle $\delta_v$, and optionally at least one of longitudinal vehicle acceleration $B_x$ and traverse vehicle acceleration $B_y$, forming a longitudinal vehicle velocity $V_x$ from said wheel speeds $V_{Ri}$, forming a desired yaw velocity $w_s$ from at least said front axle steering angle $\delta_v$, determining a utilized coefficient of friction $\mu_A$ from at least one of said wheel speeds $V_{Ri}$ and said longitudinal vehicle acceleration $B_x$, estimating a sideslip angle β from at least one of said wheel speeds $V_{Ri}$ and said transverse acceleration $B_y$, determining whether said sideslip angle β exhibits a positive gradient or a negative gradient, determining a first sideslip angle limit value $\beta_{g1}$ from said utilized coefficient of friction $\beta_A$ and said longitudinal vehicle velocity $V_x$, determining a second sideslip angle limit value $\beta_2$ from said first sideslip angle limit value $\beta_{g1}$, said limit value $\beta_{g2}$ being greater than said limit value $\beta_{g1}$, comparing said estimated sideslip angle β with said first limit value $\beta_{g1}$, effecting a normal control mode when β is less than $\beta_{g1}$ or when β is greater than $\beta_{g1}$ but less than $B_{g2}$ and said gradient is negative, varying brake pressure so that w approaches $w_s$ when said normal control mode is effected, effecting a special control mode when β is greater than $\beta_{g1}$ and said gradient is positive or when β is greater than $\beta_{g2}$, and varying brake pressure so that β is limited to $\beta_{g1}$ when said special control mode is effected.

2. Method as in claim 1 wherein said first sideslip angle limit value $\beta_{g1}$ is determined from a stored characteristic map having as arguments longitudinal vehicle velocity $V_x$ and utilized coefficient of friction $\mu_A$.

3. Method as in claim 2 wherein said characteristic map provides a raw value $\beta_R$ based on said arguments, said value $\beta_{g1}$ being determined by filtering $\beta_R$.

4. Method as in claim 1 wherein said second sideslip unit value $\beta_{g2}$ is determined according to $P_{Krit}\beta_{g1}$, where $P_{Krit}>1$.

5. Method as in claim 1 wherein said normal control mode is effected whenever $V_x$ falls below a predetermined value.

6. Method as in claim 1 wherein a return is made from special control mode to normal control mode when β is less than $\beta_{g2}$ and $W.W_s<0$.

7. Method as in claim 1 wherein a return is made from special control mode to normal control mode when β is less than $\beta_{g2}$ and the absolute value of w is less than the absolute value of the product of $w_s$ and a control parameter.

8. Method as in claim 1 further comprising determining whether said yaw velocity w exhibits a positive gradient or a negative gradient, comparing said yaw velocity w to said desired yaw velocity $w_s$, and building up brake pressure when w exhibits a positive gradient and exceeds $w_s$ by a predetermined value.

9. Method as in claim 1 further comprising building up brake pressure when the sideslip angle β exhibits a positive gradient and B exceeds a predetermined value.

* * * * *

UNITED STATES PATENT AND TRADEMARK OFFICE
CERTIFICATE OF CORRECTION

PATENT NO. : 5,455,770
DATED : October 3, 1995
INVENTOR(S) : Hadeler et al.

It is certified that error appears in the above-indentified patent and that said Letters Patent is hereby corrected as shown below:

Col. 1, line 39    Should read "HHL" not EHL.

Col. 14, line 33   Should read "$\beta_{g2}$" not $\beta_2$.

Col. 12, line 25   Should read "P$\beta$-aus" not P$\beta$-aud.

Signed and Sealed this

Fifteenth Day of April, 1997

Attest:

BRUCE LEHMAN

Attesting Officer    Commissioner of Patents and Trademarks